United States Patent
Hershey et al.

(10) Patent No.: US 9,897,127 B1
(45) Date of Patent: Feb. 20, 2018

(54) FASTENING DEVICE WITH INTEGRATED SENSOR

(71) Applicant: General Electric Company, Schenectady, NY (US)

(72) Inventors: John Erik Hershey, Ballston Lake, NY (US); Matthew Christian Nielsen, Glenville, NY (US); Christopher Donald Johnson, Niskayuna, NY (US); Michael Joseph Dell'Anno, Clifton Park, NY (US); Joji Joykutty, Karnataka (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/584,404

(22) Filed: May 2, 2017

(51) Int. Cl.
| | |
|---|---|
| *G01B 7/30* | (2006.01) |
| *G01B 5/30* | (2006.01) |
| *F16B 31/02* | (2006.01) |
| *G01B 7/16* | (2006.01) |

(52) U.S. Cl.
CPC .............. *F16B 31/02* (2013.01); *G01B 5/30* (2013.01); *G01B 7/16* (2013.01)

(58) Field of Classification Search
CPC .............. F16B 31/02; G01B 5/30; G01B 7/16
USPC ................................................... 73/760, 761
See application file for complete search history.

(56) References Cited

U.S. PATENT DOCUMENTS

| 4,846,001 A * | 7/1989 | Kibblewhite ....... B25B 23/1425 310/322 |
| 5,418,499 A | 5/1995 | Nakao |
| 5,942,894 A * | 8/1999 | Wincheski ........... G01N 27/902 324/220 |

(Continued)

FOREIGN PATENT DOCUMENTS

| DE | 19831270 A1 | 1/2000 |
| DE | 102010001144 A1 | 7/2011 |
| WO | 2010071607 A1 | 6/2010 |

OTHER PUBLICATIONS

Eliasson, Jens et al. "A SOA-based Framework for Integration of Intelligent Rock Bolts with Internet of Things", Industrial Technology (ICIT), 2013 IEEE International Conference, Feb. 25-28, 2013, (pp. 1962-1967, 6 total pages).

*Primary Examiner* — Lisa Caputo
*Assistant Examiner* — Jamel Williams
(74) *Attorney, Agent, or Firm* — Nitin N. Joshi (57) ABSTRACT

A fastening device may include a hollow void. The hollow void may contain an inner coil proximate to a first end of the device, a sensing portion to sense a characteristic associated with the fastening device during a sensing time window, and a controller. The controller may rectify an alternating current from the inner coil during a charging time window, store energy associated with the rectified alternating current, and use the stored energy to charge the sensing portion during the sensing time window. An outer coil outside the fastening device may be located proximate to a second end of the device as compared to the inner coil. An interface portion (Continued)

outside the fastening device may provide an alternating current to the outer coil during the charging time window, detect the sensed characteristic via the outer coil during the sensing time window, and transmit an indication of the detected characteristic value.

23 Claims, 11 Drawing Sheets

(56) References Cited

U.S. PATENT DOCUMENTS

| | | | |
|---|---|---|---|
| 7,146,866 B2* | 12/2006 | Morelli | G01L 1/125 73/760 |
| 7,295,003 B2* | 11/2007 | Uyehara | G01N 27/9033 324/219 |
| 7,317,314 B2* | 1/2008 | Zimmermann | G01L 1/125 324/209 |
| 7,350,420 B2 | 4/2008 | Burmann | |
| 8,262,354 B2 | 9/2012 | Hoffmann | |
| 2009/0071078 A1 | 3/2009 | Rakow et al. | |
| 2011/0158806 A1 | 6/2011 | Arms et al. | |
| 2016/0107273 A1* | 4/2016 | Groche | B21K 25/00 29/447 |
| 2016/0370268 A1* | 12/2016 | Kondo | H01H 35/006 |

* cited by examiner

FASTENING DEVICE WITH INTEGRATED SENSOR

BACKGROUND

It is often desirable to make a physical machine more able to achieve its operating response. To enable an industrial system comprised of one or more machines to achieve the design response, a reference state and an actual state assessment are required so as to change the machine(s) setpoints. An assessment and/or predictions regarding the conditional state of an industrial asset, such as a mechanical system is required. For example, the estimation of Remaining Useful Life ("RUL") of a mechanical system, such as an aircraft engine or parts of such engine, to physically or operationally change the system's assignment and thereby shape via the asset's operation, when the system should be maintained or replaced. Even with improvements in sensor and computer state estimation and control technologies, however, accurately making such operating control, assessments and/or predictions can be a difficult task. For example, mounting a large number of dedicated sensors in a mechanical system might be impractical, such as in high temperature or harsh areas and may not always provide sufficiently accurate data.

It would therefore be desirable to provide systems and methods to facilitate assessments and/or predictions for an industrial asset in an automatic and accurate manner.

SUMMARY

Using a simple physical article to describe the invention, a bolt is used as an exemplar. According to some embodiments, a fastening device may include a hollow void. The hollow void may contain an inner coil proximate to a first end of the device, a sensing portion to sense a characteristic associated with the fastening device during a sensing time window, and a controller. The controller may rectify an alternating current from the inner coil during a charging time window, store energy associated with the rectified alternating current, and use the stored energy to charge the sensing portion during the sensing time window. An outer coil outside the fastening device may be located proximate to a second end of the device as compared to the inner coil. An interface portion outside the fastening device may provide an alternating current to the outer coil during the charging time window, detect the sensed characteristic via the outer coil during the sensing time window, and transmit an indication of the detected characteristic value.

Some embodiments comprise: means for charging, by an interface portion during a charging time window, an outer coil located outside a fastening device, wherein the fastening device extends along an axis from a first end to a second end, the interface portion is outside the fastening device, and the outer coil is proximate to the second end; means for rectifying, by a controller contained in a hollow void formed entirely within the fastening device, an alternating current from an inner coil during the charging time window, the inner coil being contained in the hollow void; means for storing, by the controller, energy associated with the rectified alternating current; means for charging, by the controller during a sensing time window, the inner coil with the stored energy, wherein the inner coil is proximate to the first end as compared to the outer coil; means for sensing, by a sensing portion contained with the hollow void, a characteristic associated with the fastening device during the sensing time window; means for detecting, by the interface portion, the sensed characteristic via the outer coil during the sensing time window; and means for transmitting, by the interface portion, an indication of the detected characteristic value.

Technical advantages of some embodiments disclosed herein include improved systems and methods to facilitate physical state assessment and/or predictions for an industrial asset in an automatic and accurate manner at a future time.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

It is often desirable to make assessment and/or predictions regarding the operation of a real world physical system, such as an electro-mechanical system. For example, it may be helpful to predict the Remaining Useful Life ("RUL") of an electro-mechanical system, such as an aircraft engine or components on said engine, to cause via the dynamical operation of said engine, when the system should be maintained or replaced. In some cases, an expected useful life of a system may be estimated by a calculation process involving the probabilities of failure of the system's individual components, the individual components having their own reliability measures and distributions. Such an approach, however, might tend to be more reactive than proactive.

With the advancement of sensors, communications, and computational modeling, it may be possible to consider multiple components of a system, each having its own micro-characteristics and not just average measures of a plurality of components associated with a production run or lot. Moreover, it may be possible to very accurately monitor and continually assess the health of individual components, predict their remaining lives, and consequently estimate the health and remaining useful lives of systems that employ them and cause those physical states to beneficially change by control action. This would be a significant advance for physical system design, applied prognostics, and discovering a system and methodology to do so in an accurate and efficient manner will help reduce unplanned down time and dynamical control to nearer optimality for complex systems (resulting in cost savings and increased operational efficiency). It may also be possible to achieve a more nearly optimal control of an asset if the life of the parts can be accurately determined as well as any degradation of the key components. According to some embodiments described herein, this information may be provided by a "digital twin" of a twinned physical system.

A digital twin may estimate a remaining useful life of a twinned physical system using sensors, communications, modeling, history, and computation. It may provide an answer in a time frame that is useful, that is, meaningfully prior to a projected occurrence of a failure event or suboptimal operation. It might comprise a code object with parameters and dimensions of its physical twin's parameters and dimensions that provide measured values, and keeps the values of those parameters and dimensions current by receiving and updating values via outputs from sensors embedded in the physical twin. The digital twin may be, according to some embodiments, upgraded upon occurrence of unpredicted events and other data, such as the discovery and identification of exogenous variables, which may enhance accuracy. The digital twin may also be used to prequalify a twinned physical system's reliability for a planned mission. The digital twin may comprise a real time efficiency and life consumption state estimation and control device. It may comprise a specific, or "per asset," portfolio of system models and asset specific sensors. It may receive inspection and/or operational data and track a single specific asset over its lifetime with observed data and calculated state changes. Some digital twin models may include a functional or mathematical form that is the same for like asset systems, but will have tracked parameters and state variables that are specific to each individual asset system.

Figure 1:
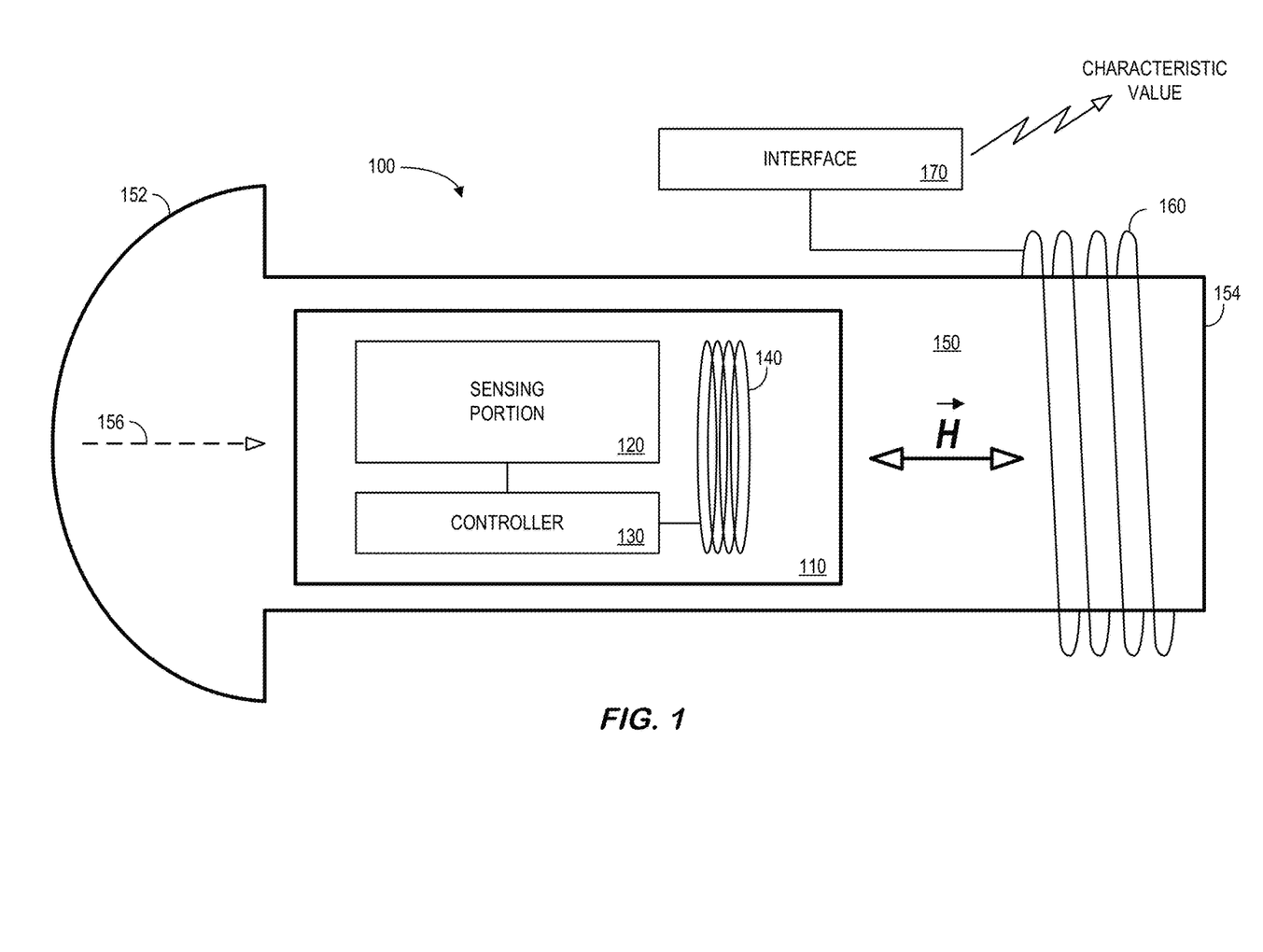
FIG. 1 is a high-level side view of a sensing apparatus in accordance with some embodiments.

FIG. 1 is a high-level side view of a sensing apparatus 100 that might be used to monitor an industrial asset (e.g., an aircraft, an engine, a jet engine, a locomotive, a generator, a wind turbine, a gas turbine, etc.) in accordance with some embodiments. In particular, the sensing apparatus 100 includes a "fastening device" 150 extending along an axis 156 from a first end 152 to a second end 154. As used herein, the phrase "fastening device" might refer to any device adapted to attach two more items together. By ways of examples only, a fastening device might be associated with a bolt, a carriage bolt, a hex bolt, a lag bolt, a flat-topped bolt, a socket bolt, a screw, a socket screw, a J-bolt, etc. As illustrated in FIG. 1, the first end 152 might be associated with a bolt head. In this case, the second end 154 might be associated with a bolt thread.

A hollow void 110 may be formed entirely within the fastening device 150. That is, there might not be any tunnel or via from the area inside the hollow void 110 to the area outside the fastening device 150. Such an arrangement might, for example, improve the strength or integrity of the fastening device 150. The hollow void 110 may contain a sensing portion 120, a controller 130, and an inner coil 140 proximate to the first end 152. The sensing portion 120 may, according to some embodiments, sense a characteristic associated with the fastening device 150 during a sensing time window. The controller 130 may be coupled to the inner coil 140 and the sensing portion 120. According to some embodiments, the controller 130 may rectify an alternating current from the inner coil 140 during a charging time window. The controller 130 may also store energy associated with the rectified alternating current and use the stored energy to charge the sensing portion 120 during the sensing time window.

The sensing apparatus 100 also includes an outer coil 160 outside the fastening device 150 proximate to the second end as compared to the inner coil 140. That is, the outer coil 160 may be located closer to the second end 154 as compared to the inner coil 140 (which is located closer to the first end 152 of the fastening device 150). An interface portion 170 may also be located outside the fastening device 150 and be coupled to the outer coil 160. The interface portion 170 may, according to some embodiments, provide an alternating current to the outer coil 160 during the charging time window. Note that the body of the fastening device 150, the inner coil 140, and/or outer coil 160 may function as a simple transformer. That is, when the interface portion 170 provides the alternating current to the outer coil 160, an alternating magnetic field ("H") will be induced within the body of the fastening device 150. This alternating magnetic field will, in turn, induce an alternating current in the inner coil 140. The induced alternating current in the inner coil 140 may be rectified and the energy may be stored by the controller 130 (during what is referred to herein as a "charging time window").

The interface portion 170 may also use the outer coil 160 to detect the sensed characteristic via the outer coil 160 during the sensing time window. That is, the controller 130 may use the stored energy to charge the sensing portion 120 which might, for example, oscillate at a frequency that varies based on the sensed characteristic (e.g., it might oscillate at higher frequencies as the temperature within the hollow void 110 increases). This frequency may then be detected by the interface portion 170 via the outer coil 160. The interface portion 170 may also transmit an indication of the detected characteristic value (e.g., to a remote monitoring platform).

Figure 2:
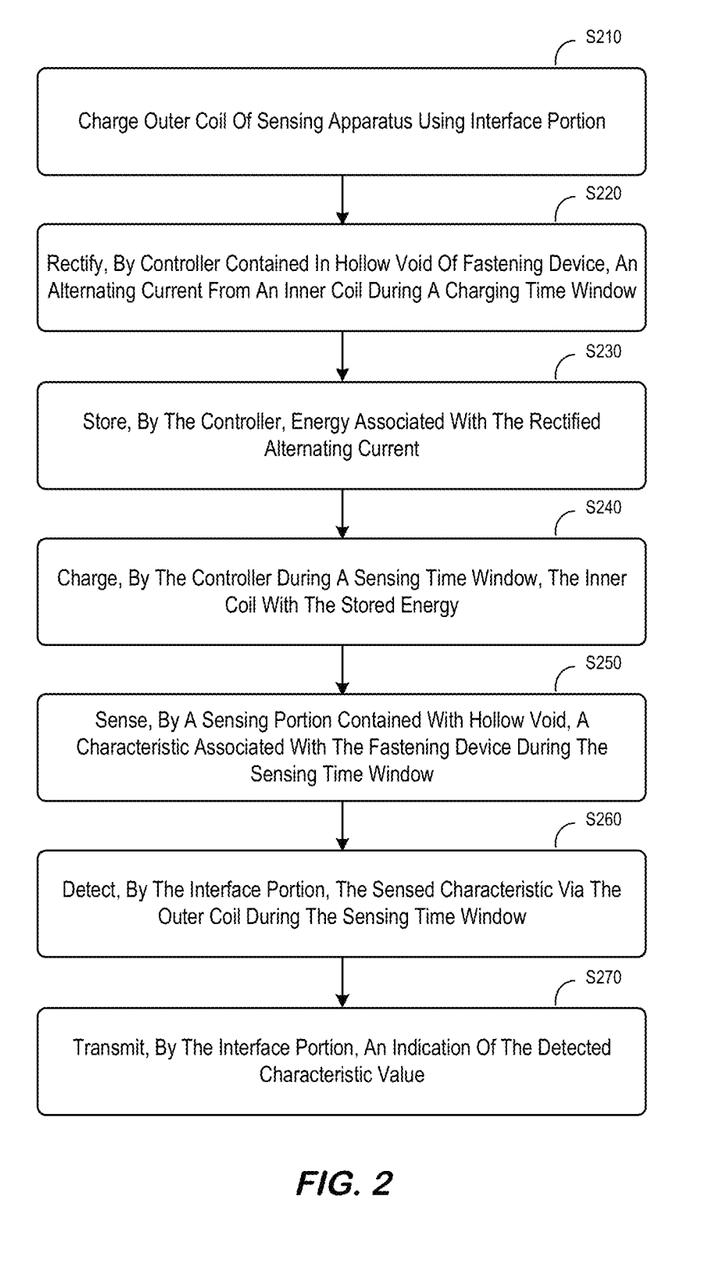
FIG. 2 illustrates a sensing method that might be performed according to some embodiments.
Figure 3:
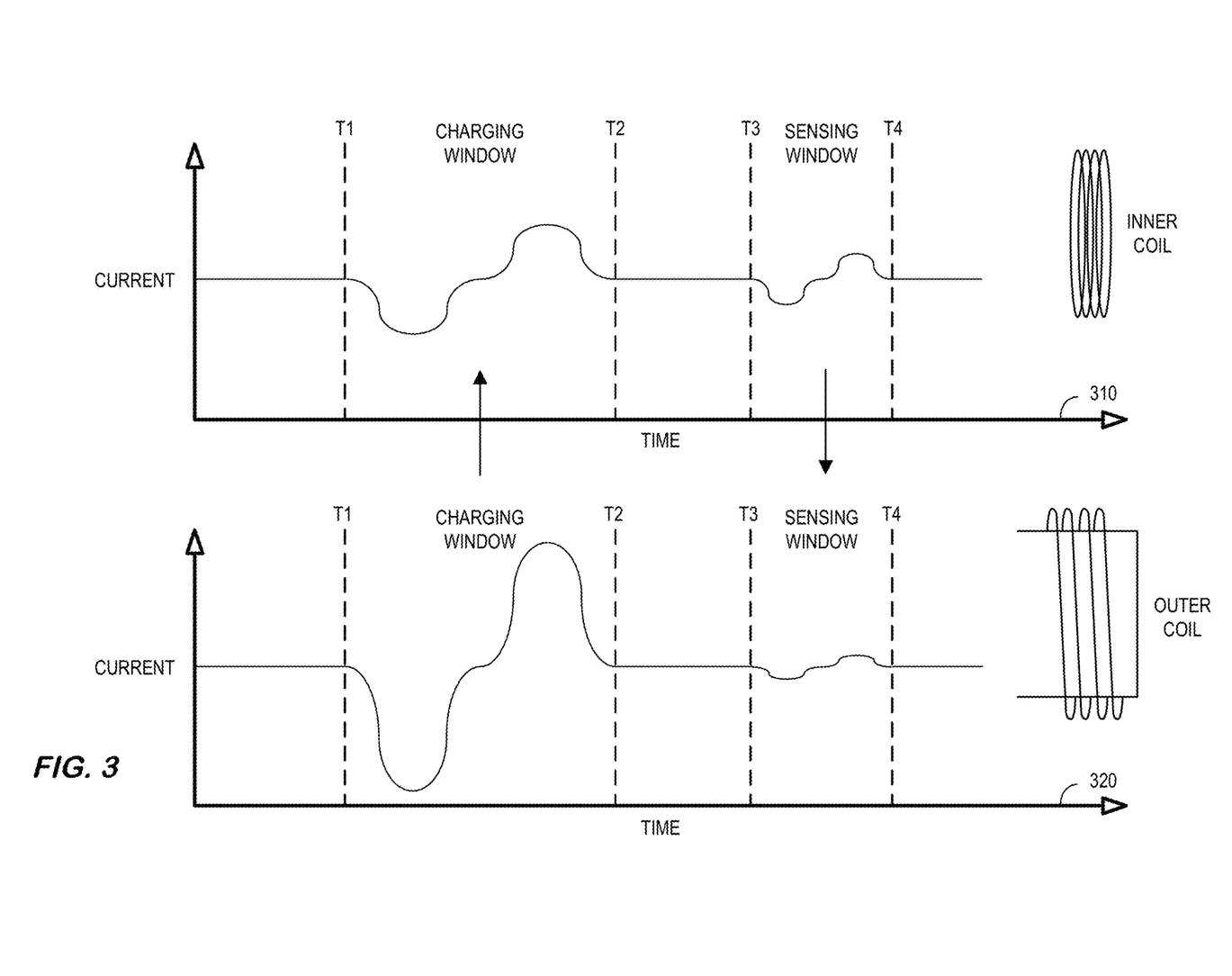
FIG. 3 includes graphical timelines to illustrate operation of a sensing apparatus in accordance with some embodiments.

FIG. 2 illustrates a sensing method that might be performed according to some embodiments. Note that the flow charts described herein do not imply a fixed order to the steps, and embodiments of the present invention may be practiced in any order that is practicable. At S210, an interface portion of a sensing apparatus may charge, during a "charging time window," an outer coil located outside a fastening device, wherein the fastening device extends along an axis from a first end to a second end, the interface portion is outside the fastening device, and the outer coil is proximate to the second end. Consider, for example, FIG. 3 which includes graphical timelines 310, 320 to illustrate operation of a sensing apparatus in accordance with some embodiments. In particular, the first timeline 310 plots current over time for an inner coil and the second timeline 320 plots current over time for an outer coil. During the charging window (that is, from time T1 to time T2), an alternating current supplied to the outer coil induces a corresponding alternating current within the inner coil (via an alternating magnetic field).

Referring again to FIG. 2, at S220 a controller contained in a hollow void formed entirely within the fastening device may rectify this alternating current from the inner coil (contained in the hollow void) during the charging time window. At S230, the controller may store energy associated with this rectified alternating current. At S240, the controller may charge, during a "sensing time window," the inner coil with the stored energy (the inner coil being proximate to the first end as compared to the outer coil). At S250, a sensing portion contained with the hollow void may sense a characteristic associated with the fastening device during the sensing time window. At S260, the interface portion may detect the sensed characteristic via the outer coil during the sensing time window. For example, as illustrated by the timelines 310, 320 of FIG. 3, an alternating current supplied to the inner coil during the sensing window (that is, from time T3 to time T4) having a frequency that varies based on the detected characteristic will induce an alternating current having the same frequency within the outer coil. Although the charging and sensing windows are separated in FIG. 3, note that they might instead be adjacent (e.g., with T2 being substantially equal to T3). At S270, the interface portion may transmit an indication of the detected characteristic value (e.g., to a remote monitoring platform via a wired or wireless transmission).

Figure 4:
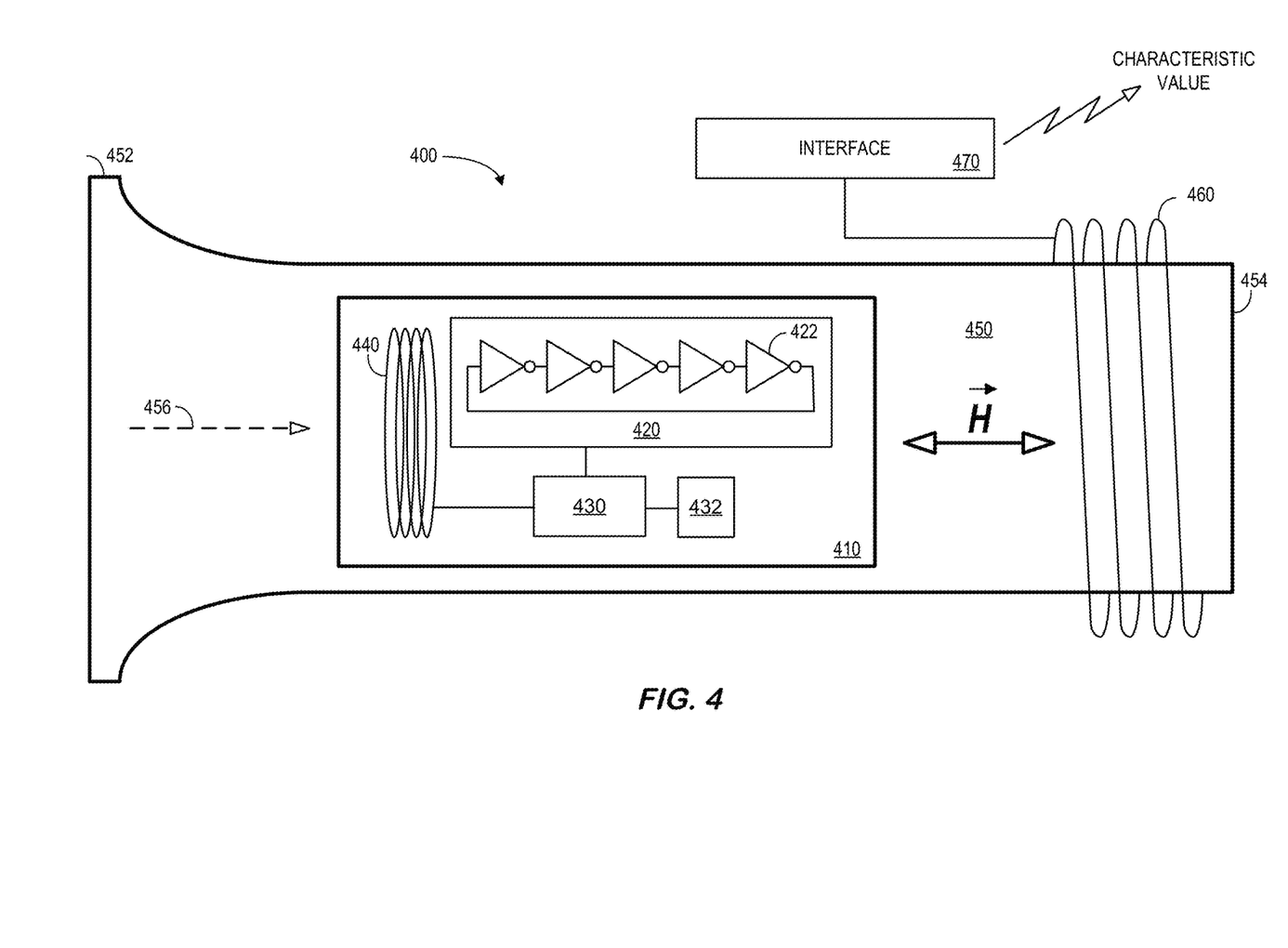
FIG. 4 is a more detailed view of an apparatus including a bolt with an integrated sensor in accordance with some embodiments.

FIG. 4 is a more detailed view of an apparatus 400 including a bolt 450 with an integrated sensor in accordance with some embodiments. As before, the bolt 450 extends along an axis 456 from a first end 452 to a second end 454. In the example of FIG. 4, the first end 452 is associated with a bolt head while the second end 454 is associated with a bolt thread. A hollow void 410 is formed entirely within the bolt 450 and contains a sensing portion 420, a controller 430, and an inner coil 440 proximate to the first end 452.

The sensing portion 420 may, according to some embodiments, sense a "characteristic" associated with the bolt 450 during a sensing time window. As used herein, the term "characteristic" may refer to any type of physical measurement. By ways of examples only, a sensed characteristic might be associated with stress, strain, torque, compression, pressure, shear, temperature, etc. Although only a single type of characteristic is measured in the embodiments described herein, note that the bolt 450 might be able to measure a plurality of different types of sensed values. As illustrated in FIG. 4, the sensing portion 420 might be associated with a ring-oscillator 422 that oscillates at a frequency based on the characteristic. The ring-oscillator 422 might comprise, for example, a chained series of inverters (e.g., having an odd number of inverters). Some embodiments might be associated with flexible organic transistors and/or wrinkled rubrene single-crystal Field-Effect Transistors ("FETs"). According to some embodiments, the output of one inverter is connected to the input of an adjacent inverter, and the output of the last inverter is connected to the input of the first inverter. Note that the ring-oscillator 422 may be straightforward to implement using many different circuit technologies, and the substrate of the circuit technology used can significantly affect the frequency at which the ring-oscillator 422 oscillates under different environments.

The controller 430 may be coupled to the inner coil 440 and the sensing portion 420. According to some embodiments, the controller 430 may rectify an alternating current from the inner coil 440 during a charging time window. The controller 430 may also store energy associated with the rectified alternating current and use the stored energy to charge the sensing portion 420 during the sensing time window. For example, the controller 430 might store the energy using an energy storage device 432, such as a capacitor.

The sensing apparatus 400 also includes an outer coil 460 outside the bolt 450 proximate to the second end as compared to the inner coil 440. That is, the outer coil 460 may be located closer to the second end 454 as compared to the inner coil 440 (which is located closer to the first end 452 of the bolt 450). According to some embodiments, the outer coil 460 might be associated with a nut, a wing nut, a cap, a coupling nut, an anchor, a sleeve, a washer, etc. Note that the inner and outer coils 440, 460 may be oriented such that a line perpendicular to the planes comprising the loops is essentially parallel to the length axis of the bolt 450.

An interface portion 470 may also be located outside the bolt 450 and be coupled to the outer coil 460. The interface portion 470 may, according to some embodiments, provide an alternating current to the outer coil 460 during the charging time window. As was the case with FIG. 1, the body of the bolt 450, the inner coil 440, and/or outer coil 460 may function as a simple transformer such that when the interface portion 470 provides the alternating current to the outer coil 460, an alternating magnetic field ("H") is induced within the body of the bolt 450. This alternating magnetic field will, in turn, induce an alternating current in the inner coil 440. The induced alternating current in the inner coil 440 may be rectified and the energy may be stored in the energy storage device 432 (during the charging time window). To facilitate this process, the bolt 450 might be composed of a ferromagnetic material, iron, cobalt, nickel, etc.

The interface portion 470 may also use the outer coil 460 to detect the sensed characteristic via the outer coil 460 during the sensing time window. That is, the controller 430 may use the energy stored in the energy storage device 432 to charge the ring-oscillator 422 which might, for example, oscillate at a frequency that varies based on the sensed characteristic (e.g., it might oscillate at higher frequencies as stress within the bolt 450 increases). According to some embodiments, a current at this frequency is supplied to the inner coil 440 and may then be detected by the interface portion 470 via the outer coil 460. The interface portion 470 may then transmit an indication of the detected characteristic value (e.g., to a remote monitoring platform). This communication may be, according to some embodiments, via a bi-directional channel. Moreover, the interface 470 might receive requests from the IoT and/or convey transmissions to the IoT. Note that the transmissions from the interface 470 might be in response to a request received from the IoT or the transmissions may instead be generated sua sponte.

Thus, embodiments may be associated with a bolt 450 with a completely integrated sensor (e.g., for strain, stress, temperature, etc.). The sensor has no direct physical contact with an associated sensor reading device. The bolt 450 may, according to some embodiments, be considered to have an identification number stamped or engraved on it which may be associated to an Internet of Things ("IoT") address associated with that particular bolt 450. The bolt 450 may then be considered an individually addressable piece of infrastructure that may be interrogated by, or report through, the IoT.

Figure 5:
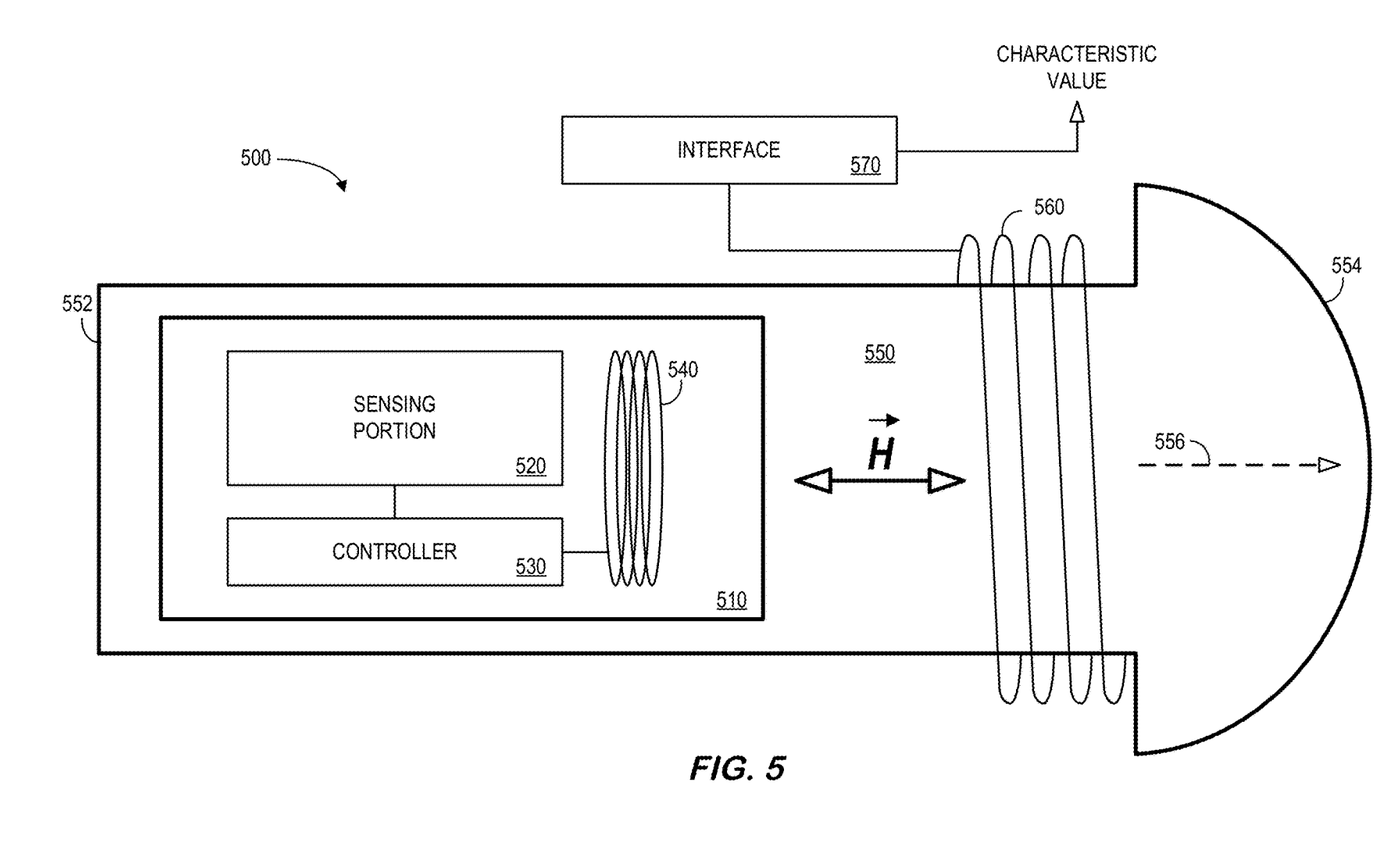
FIG. 5 is a high-level side view of a sensing apparatus in accordance with another embodiment.

In the example of FIG. 4, the first end 452 is associated with a bolt head and the second end 454 is associated with a bolt thread. According to other embodiments, first end might instead be associated with a bolt thread while the second end is associated with a bolt head. For example, FIG. 5 is a high-level side view of a sensing apparatus 500 in accordance with such an embodiment. As before, the sensing apparatus 500 includes a "fastening device" 550 (e.g., a bolt) extending along an axis 556 from a first end 552 to a second end 554. As illustrated in FIG. 5, the second end 554 is associated with a bolt head. Moreover, the first end 552 might be associated with a bolt thread. A hollow void 510 is formed entirely within the fastening device 550 and contains a sensing portion 520, a controller 530, and an inner coil 540 proximate to the first end 552. The sensing portion 520 may sense a characteristic associated with the fastening device 550 during a sensing time window. The controller 530 may be coupled to the inner coil 540 and the sensing portion 520 may rectify an alternating current from the inner coil 540 during a charging time window. The controller 530 may also store energy associated with the rectified alternating current and use the stored energy to charge the sensing portion 520 during the sensing time window.

The sensing apparatus 500 also includes an outer coil 560 outside the fastening device 550 proximate to the second end as compared to the inner coil 540. An interface portion 570 may also be located outside the fastening device 550 and be coupled to the outer coil 560. The interface portion 570 may provide an alternating current to the outer coil 560 during the charging time window. When the interface portion 570 provides the alternating current to the outer coil 560, an alternating current is induced in the inner coil 540 and may be rectified so the energy can be stored. The interface portion 570 may also use the outer coil 560 to detect the sensed characteristic via the outer coil 560 during the sensing time window. The interface portion 570 may then transmit an indication of the detected characteristic value (e.g., to a remote monitoring platform).

Figure 6:
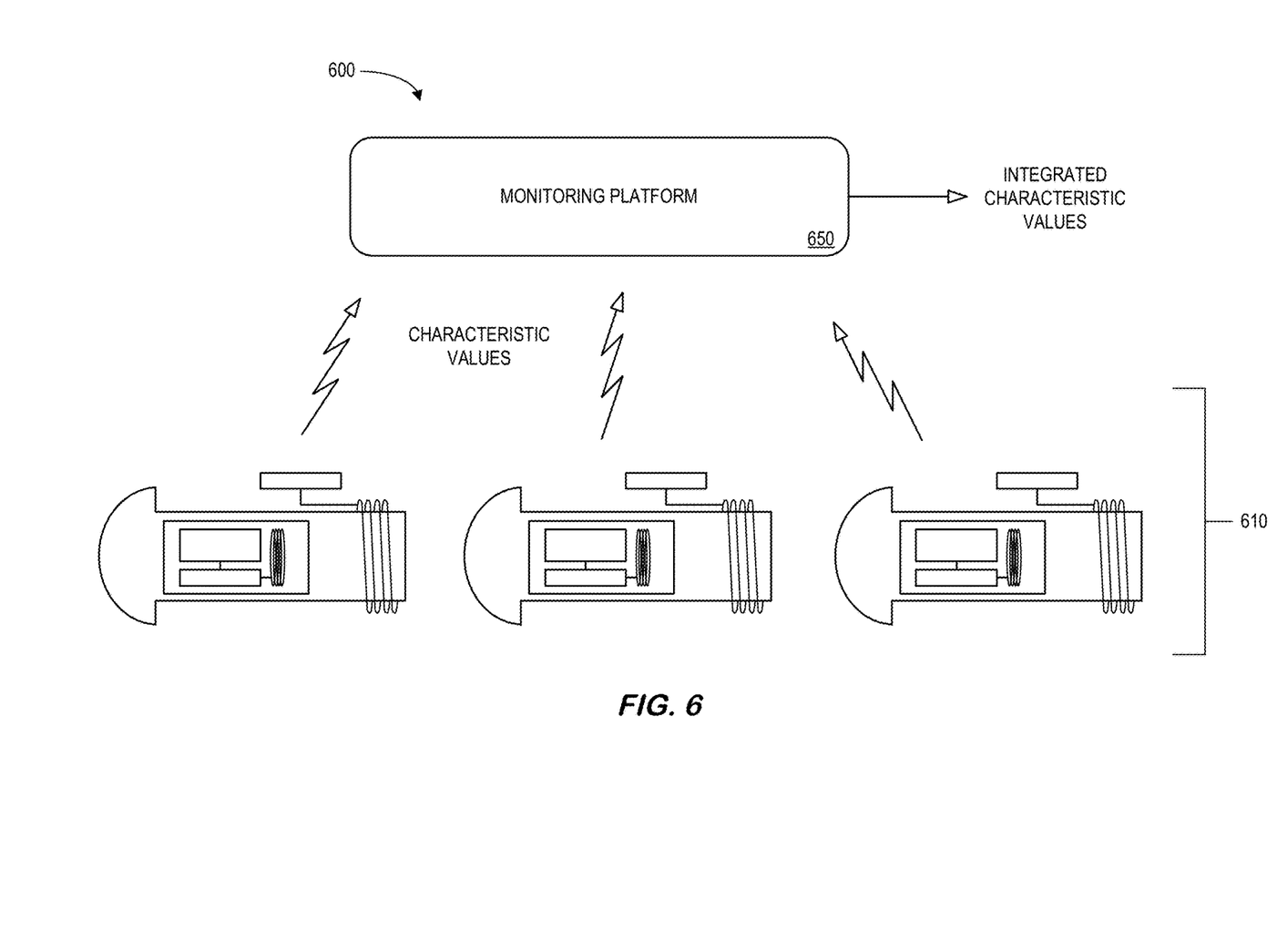
FIG. 6 is a high-level block diagram of a sensing system for an industrial asset according to some embodiments.

While FIGS. 1 through 5 have been described with respect to a single sensing apparatus, note that embodiments might be associated with any number of sensing apparatuses. For example, FIG. 6 is a high-level block diagram of a sensing system 600 for an industrial asset according to some embodiments. In this case, a plurality of sensing apparatuses 610 transmit characteristic values to a monitoring platform 650. The monitoring platform 650 may then integrate the detected characteristic values (e.g., via a model of the industrial asset). Note that devices, including those associated with the system 600 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The apparatus monitoring and dynamical control platform 650 may store information into and/or retrieve information from various data sources, such as a computer data store storing historical industrial asset information. The various data sources may be locally stored or reside remote from the monitoring platform 650. Although a single monitoring platform 650 is shown in FIG. 6, any number of such devices may be included. Moreover, various devices described herein might be combined according to embodiments of the present invention. For example, in some embodiments, the monitoring platform 650 and one or more data sources might comprise a single apparatus. The function of the monitoring platform 650 may be performed by a constellation of networked apparatuses, in a distributed processing, or cloud-based architecture.

An operator may access the monitoring and control platform 650 via one a remote operator platform (e.g., a Personal Computer ("PC"), tablet computer, smartphone, etc.) to view information about and/or manage the industrial asset with any of the embodiments described herein. According to some embodiments, an interactive graphical display interface may let an operator define and/or adjust certain parameters and/or provide or receive automatically generated recommendations, alerts, or results.

Figure 7:
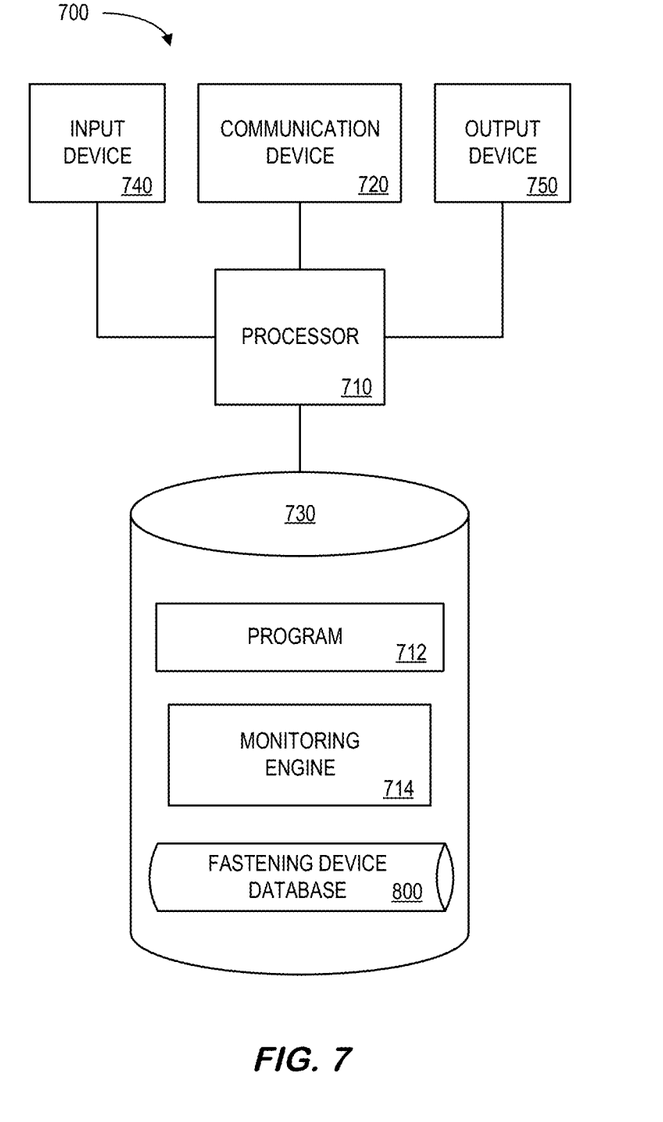
FIG. 7 illustrates a monitoring platform in accordance with some embodiments.

The embodiments described herein may be implemented using any number of different hardware configurations. For example, FIG. 7 is block diagram of a monitoring platform 700 that may be, for example, associated with the system 600 of FIG. 6. The monitoring platform 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote bolts, operator platform, etc. The monitoring platform 700 further includes an input device 740 (e.g., a computer mouse and/or keyboard to input system information and/or modeling data) and/an output device 750 (e.g., a computer monitor to render display, transmit recommendations, generate alerts, and/or create reports). According to some embodiments, a mobile device and/or PC may be used to exchange information with the monitoring platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a monitoring engine 714 for controlling the processor 710. The processor 710 performs instructions of the programs 712, 714, and thereby operates in accordance with any of the embodiments described herein. For example, the processor 710 may receive data from a number of different bolts and output integrated characteristic values (e.g., and average temperature associated with an aircraft wing).

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the monitoring and control platform 700 from another device; or (ii) a software application or module within the monitoring platform 700 from another software application, module, or any other source.

In some embodiments (such as the one shown in FIG. 7), the storage device 730 further stores a fastening device database 800. An example of a database that may be used in connection with the monitoring platform 700 will now be described in detail with respect to FIG. 8. Note that the database described herein is only one example, and additional and/or different information may be stored therein. Moreover, various databases might be split or combined in accordance with any of the embodiments described herein.

Figure 8:
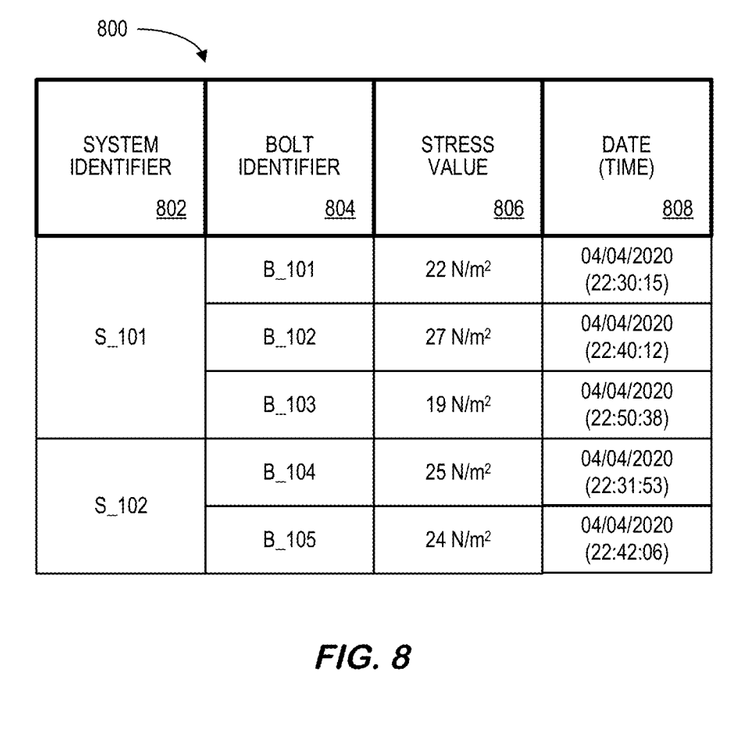
FIG. 8 is a tabular portion of a fastening device database according to some embodiments.

Referring to FIG. 8, a table is shown that represents the fastening device database 800 that may be stored at the monitoring platform 700 according to some embodiments. The table may include, for example, entries identifying bolts having integrated sensors in accordance with any of the embodiments described herein. The table may also define fields 802, 804, 806, 808 for each of the entries. The fields 802, 804, 806, 808 may, according to some embodiments, specify: a system identifier 802, a bolt identifier 804, a stress value 806, and a date and time 808. The fastening device database 800 may be created and updated, for example, when an industrial asset system is established, bolts are installed or replaced, bolts report current operating values, etc.

The system identifier 802 may be, for example, a unique alphanumeric code identifying a system having a number of different bolts with integrated sensors (e.g., an aircraft engine, wind turbine farm, etc.). The bolt identifier 804 may be, for example, a unique alphanumeric code identifying a bolt with an integrated sensor. According to some embodiments, a bolt identifier 804 might comprise an Internet Protocol ("IP") address. The stress value 806 indicates the most recent detected characteristic received from each bolt while the date and time 808 indicate when the value was reported.

Figure 9:
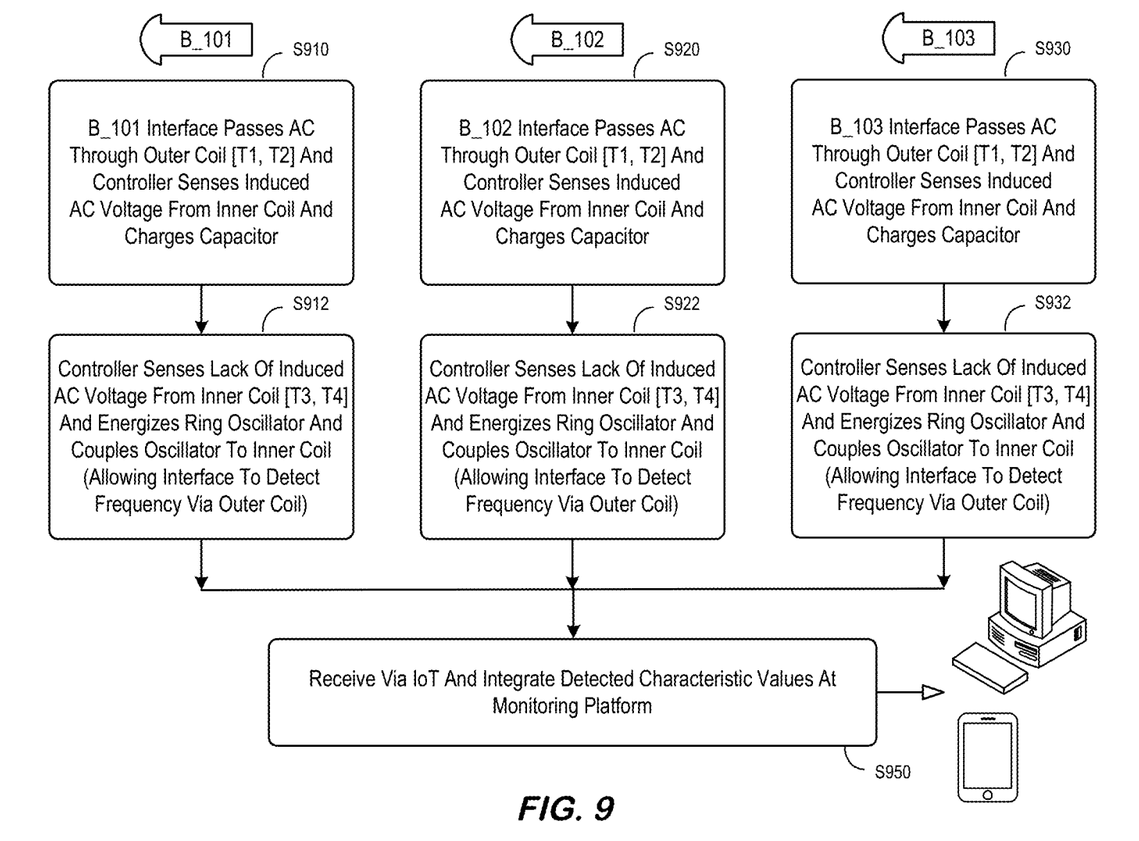
FIG. 9 illustrates a sensing system method that might be performed in accordance with some embodiments.

FIG. 9 illustrates a sensing system method that might be performed in accordance with some embodiments. In this example, the sensing system is associated with three sensing apparatuses (e.g., three bolts B_101, B_102, and B_103, each having an integrated sensor). At S910, a charging window (from T1 to T2) includes an interface portion passing alternating current through an outer coil while a controller receives AC voltage at an inner coil and stores the energy. At S912, a sensing window (from T3 to T4) includes the controller coupling a ring-oscillator to the inner coil and the interface portion detecting a frequency of oscillation (and using the detected frequency to report a value). Similar steps S920, S922 are performed for bolt B_102 while steps S930, S932 are performed for bolt B_103.

Figure 10:
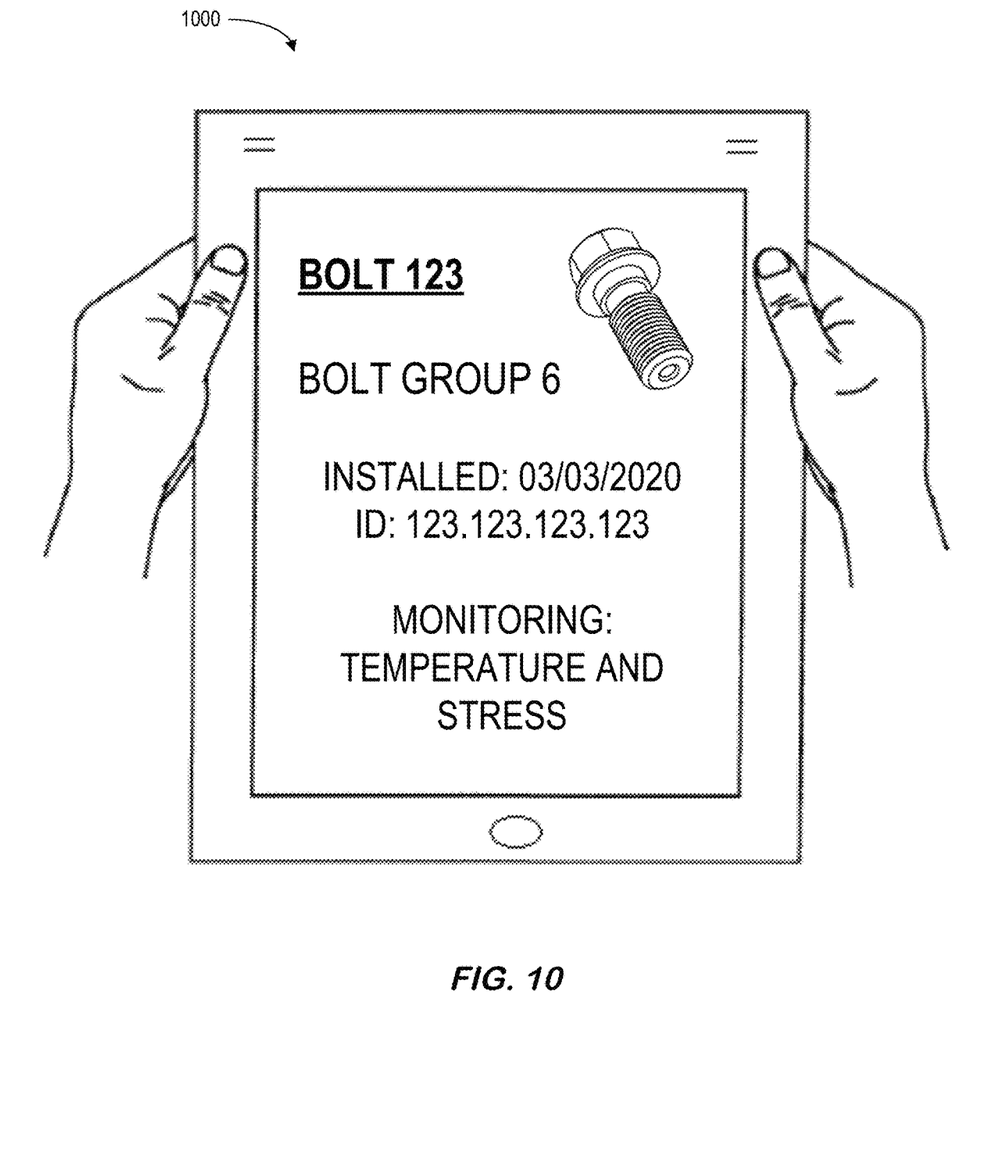
FIG. 10 illustrates a tablet computer displaying an interactive graphical user interface according to some embodiments.
Figure 11:
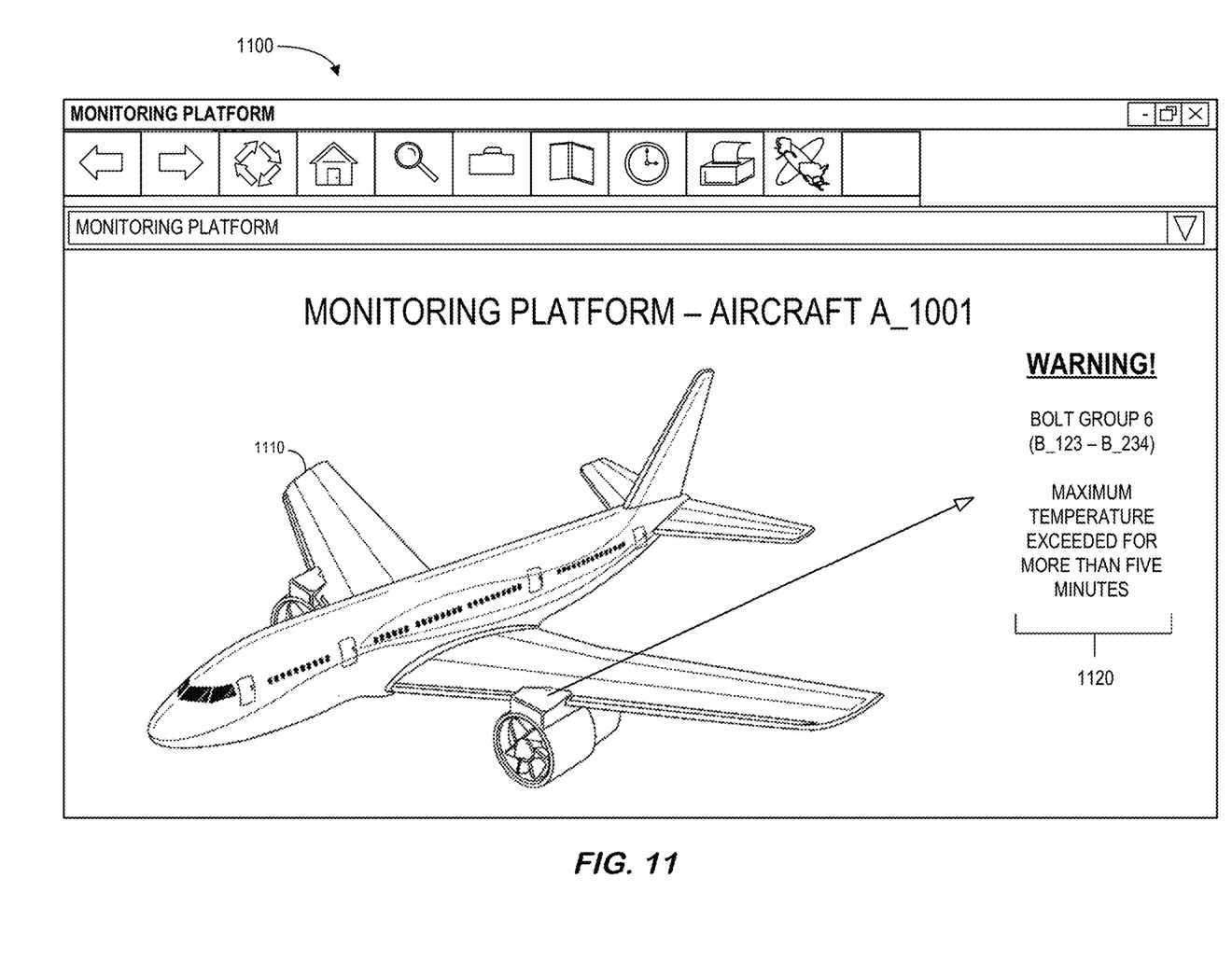
FIG. 11 is an interactive sensing system display associated with an aircraft in accordance with some embodiments.

At S950, a monitoring platform receives the three detected values, integrates the information, and transmits data to operator platforms to be provided on various displays. For example, FIG. 10 illustrates a tablet computer 1000 displaying an interactive graphical user interface according to some embodiments. The display includes a unique identifier, a graphical representation of the fastening device, when the device was installed, a description of the location and/or values being monitored by the device, etc. FIG. 11 is an interactive sensing system display 1100 associated with an aircraft in accordance with some embodiments. The display 1100 includes a graphical representation of the aircraft 1110 and/or the locations of fastening devices. According to some embodiments, user selection of one of the fastening devices (e.g., via a touchscreen or computer pointer) results in presentation of additional information 1120 (e.g., via a pop-up window). In some embodiments, an operator may use the display 1100 to adjust or control operation of the fastening devices (e.g., by sending a request to a group of bolts associated with a jet aircraft engine).

Thus, some embodiments may provide systems and methods to facilitate assessments and/or predictions for a physical system in an automatic and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on bolts that measure stress, any of the embodiments described herein could be applied to other industrial asset factors related to hardware deterioration, non-engine implementations, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A sensing apparatus, comprising:
 a fastening device extending along an axis from a first end to a second end, including:
  a hollow void formed entirely within the fastening device, containing:
   an inner coil proximate to the first end,
   a sensing portion to sense a characteristic associated with the fastening device during a sensing time window, and
   a controller, coupled to the inner coil and the sensing portion, to: (i) rectify an alternating current from the inner coil during a charging time window, (ii) store energy associated with the rectified alternating current, and (iii) use the stored energy to charge the sensing portion during the sensing time window;
 an outer coil outside the fastening device proximate to the second end as compared to the inner coil; and
 an interface portion, outside the fastening device and coupled to the outer coil, to: (i) provide an alternating current to the outer coil during the charging time window, (ii) detect the sensed characteristic via the outer coil during the sensing time window, and (iii) transmit an indication of the detected characteristic value.

2. The apparatus of claim 1, wherein the fastening device is associates with at least one of: (i) a bolt, (ii) a carriage bolt, (ii) a hex bolt, (iii) a lag bolt, (iv) a flat-topped bolt, (v) a socket bolt, (vi) a screw, (vii) a socket screw, and (viii) a J-bolt.

3. The apparatus of claim 2, wherein the first end is associated with a bolt head and the second end is associated with a bolt thread.

4. The apparatus of claim 2, wherein the first end is associated with a bolt thread and the second end is associated with a bolt head.

5. The apparatus of claim 1, wherein the characteristic is associated with at least one of: (i) stress, (ii) strain, (iii) torque, (iv) compression, (v) pressure, (vi) shear, (vii) temperature, and (viii) a plurality of different types of sensed values.

6. The apparatus of claim 1, wherein the sensing portion is associated with at least one of: (i) a ring-oscillator that oscillates at a frequency based on the characteristic, (ii) a chained series of inverters, (iii) flexible organic transistors, and (iv) wrinkled rubrene single-crystal field-effect transistors.

7. The apparatus of claim 1, wherein the controller stores energy via a capacitor.

8. The apparatus of claim 1, wherein the fastening device is composed of at least one of the following: (i) a ferromagnetic material, (ii) iron, (iii) cobalt, and (iv) nickel.

9. The apparatus of claim 1, wherein the outer coil is associated with at least one of: (i) a nut, (ii) a wing nut, (iii) a cap, (iv) a coupling nut, (v) an anchor, (vi) a sleeve, and (vii) a washer.

10. The apparatus of claim 1, wherein the interface portion is to communicate the detected characteristic value via at least one of: (i) a wireless transmitter, (ii) an Internet of Things interface, and (iii) a wired interface.

11. The apparatus of claim 1, wherein the fastening device is associated with a unique fastening device identifier.

12. A fastening device extending along an axis from a first end to a second end, comprising:
   a hollow void formed entirely within the fastening device, containing:
      an inner coil proximate to the first end,
      a sensing portion to sense a characteristic associated with the fastening device during a sensing time window, and
      a controller, coupled to the inner coil and the sensing portion, to: (i) rectify an alternating current from the inner coil during a charging time window, (ii) store energy associated with the rectified alternating current, and (iii) use the stored energy to charge the sensing portion during the sensing time window.

13. The fastening device of claim 12, wherein the characteristic is associated with at least one of: (i) stress, (ii) strain, (iii) torque, (iv) compression, (v) pressure, (vi) shear, (vii) temperature, and (viii) a plurality of different types of sensed values.

14. The fastening device of claim 12, wherein the interface portion is to communicate the detected characteristic value via at least one of: (i) a wireless transmitter, (ii) an Internet of Things interface, and (iii) a wired interface.

15. The fastening device of claim 12, wherein the fastening device is associated with a unique fastening device identifier.

16. A method, comprising:
   charging, by an interface portion during a charging time window, an outer coil located outside a fastening device, wherein the fastening device extends along an axis from a first end to a second end, the interface portion is outside the fastening device, and the outer coil is proximate to the second end;
   rectifying, by a controller contained in a hollow void formed entirely within the fastening device, an alternating current from an inner coil during the charging time window, the inner coil being contained in the hollow void;
   storing, by the controller, energy associated with the rectified alternating current;
   charging, by the controller during a sensing time window, the inner coil with the stored energy, wherein the inner coil is proximate to the first end as compared to the outer coil;
   sensing, by a sensing portion contained with the hollow void, a characteristic associated with the fastening device during the sensing time window;
   detecting, by the interface portion, the sensed characteristic via the outer coil during the sensing time window; and
   transmitting, by the interface portion, an indication of the detected characteristic value.

17. The method of claim 16, wherein the characteristic is associated with at least one of: (i) stress, (ii) strain, (iii) torque, (iv) compression, (v) pressure, (vi) shear, (vii) temperature, and (viii) a plurality of different types of sensed values.

18. The method of claim 16, wherein the interface portion is to communicate the detected characteristic value via at least one of: (i) a wireless transmitter, (ii) an Internet of Things interface, and (iii) a wired interface.

19. The method of claim 16, wherein the fastening device is associated with a unique fastening device identifier.

20. A sensing system, comprising:
   a plurality of a sensing apparatuses, each including:
      a fastening device extending along an axis from a first end to a second end, including:
         a hollow void formed entirely within the fastening device, containing:
            an inner coil proximate to the first end,
            a sensing portion to sense a characteristic associated with the fastening device during a sensing time window, and
            a controller, coupled to the inner coil and the sensing portion, to: (i) rectify an alternating current from the inner coil during a charging time window, (ii) store energy associated with the rectified alternating current, and (iii) use the stored energy to charge the sensing portion during the sensing time window;
      an outer coil outside the fastening device proximate to the second end as compared to the inner coil; and
      an interface portion, outside the fastening device and coupled to the outer coil, to: (i) provide an alternating current to the outer coil during the charging time window, (ii) detect the sensed characteristic via the outer coil during the sensing time window, and (iii) transmit an indication of the detected characteristic value; and
   a monitoring platform in communication with the plurality of fastening devices and configured to integrate a plurality of detected characteristic values.

21. The sensing system of claim 20, wherein the fastening devices are associated with at least one of: (i) an industrial asset, (ii) an aircraft, (iii) an engine, (iv) a jet engine, (v) a locomotive, (vi) a generator, (vii) a wind turbine, and (viii) a gas turbine.

22. The sensing system of claim 20, further comprising:
   a digital twin modeling engine coupled to the monitoring platform and adapted to utilize the integrated plurality of detected characteristic values when simulating operation of an industrial asset associated with the plurality of a sensing apparatuses.

23. The sensing system of claim 22, wherein the digital twin modeling engine causes a dynamical response to change through time to shape a desired state of physical devices.

* * * * *